United States Patent [19] [11] 3,840,896
Lorbergs [45] Oct. 8, 1974

[54] CARD HANDLING MECHANISM WITH MOVABLE CARD GUIDING MEANS

[75] Inventor: Janis G. Lorbergs, Elk Grove, Ill.

[73] Assignee: Bell & Howell Company, Chicago, Ill.

[22] Filed: June 11, 1973

[21] Appl. No.: 368,607

[52] U.S. Cl. ............ 360/88, 35/35 C, 235/61.11 R, 360/105, 360/130

[51] Int. Cl..... G11b 19/26, G11b 5/54, G11b 21/02

[58] Field of Search ........... 179/100.2 R, 100.2 MD; 274/4 J; 35/35 C; 235/61.11 R; 360/88, 130, 105

[56] References Cited

UNITED STATES PATENTS

| | | | |
|---|---|---|---|
| 3,114,150 | 12/1963 | Calano et al. | 274/4 J |
| 3,703,626 | 11/1972 | Shanrock | 235/61.11 R |

OTHER PUBLICATIONS

May, "Reader For Magnetic Striped Documents or Cards," IBM Tech. Disc. Bull., Vol. 13, No. 1, June 1970, pg. 217.

*Primary Examiner*—Stanley M. Urynowicz, Jr.
*Assistant Examiner*—Robert S. Tupper
*Attorney, Agent, or Firm*—John R. Hoffman

[57] ABSTRACT

A card handling mechanism in a teaching machine for returning a magnetically striped information card to an initial position or to any selected position for replaying a word or group of words. The mechanism includes a first drive means for feeding the card in the forward direction, a second deive means for returning the card to the initial position or any desirable repeat position and a selectively operable blocking or guide means for blocking the card from end abutting engagement with the first drive means in its movement in the return direction.

8 Claims, 4 Drawing Figures

CARD HANDLING MECHANISM WITH MOVABLE CARD GUIDING MEANS

BACKGROUND OF THE INVENTION

1. Field of the Invention

This invention relates to teaching machines capable of recording sound on and reproducing sound from a magnetically striped information card and more particularly relates to improvements in a card handling mechanism operable to feed the card in a forward direction and to return the card to any desired position to permit repeatedly replaying a portion of or all of the information on the card.

2. Brief Description of the Prior Art

Known teaching machines have mechanisms capable of only feeding the information card in the forward direction past a transducer head for recording sound on or for reproducing the sound from the card. To replay the same card, it is necessary to remove the card from the machine and re-insert the card at an initial position to permit repeating the forward feed operation. Even though this replay method has satisfactorily served its purpose, it has been found desirable to return the card faster and more conveniently.

Another known teaching machine has the capability of repeating the forward feed operation without removing the information card from the machine. This machine has an orbital track with a unidirectional drive means operable to repeatedly drive the information card around the orbital track and past the transducer head. Repeated cycling of the card around the orbital track causes the card to hold a deformed shape which reduces the machine operating efficiency when passing the card linearly past the transducer head and which results in an inefficient card storage. Another advantage over the orbital track machine is the ability to repeatedly replay any portion of the card without replaying the entire card.

Still another teaching machine returns the card along the same path as the forward drive. In this machine, the reverse direction drive operates at a higher speed than the forward drive to rapidly return the card to any desired position for replaying, without removing the card from the machine, without deforming the card and without replaying the entire card. Although such a return system is very desireable and is believed to be the best system currently available, sometimes the card, especially if slightly warped, diverts into abutting or entangling engagement with the forward drive during its return movement.

SUMMARY OF THE INVENTION

The present invention provides a card handling mechanism including a forward feed drive means, a return drive means, and a blocking or guide system which is rendered operable during return driving of the card to block the card from improper engagement with the forward drive means so that the card cannot abut against or become entangled in the forward drive means during return movement.

While this invention is susceptible of embodiment in many different forms, there is shown in the drawings and will herein be described in detail a specific embodiment thereof, with the understanding that the present disclosure is to be considered as an exemplification of the principles of the invention and is not intended to limit the invention to the embodiment illustrated. Further and other features of this invention will be readily understood by those skilled in the art with reference to the following description of the accompanying drawings.

DESCRIPTION OF THE PREFERRED EMBODIMENT

Figures 1, 2, 3, 4:
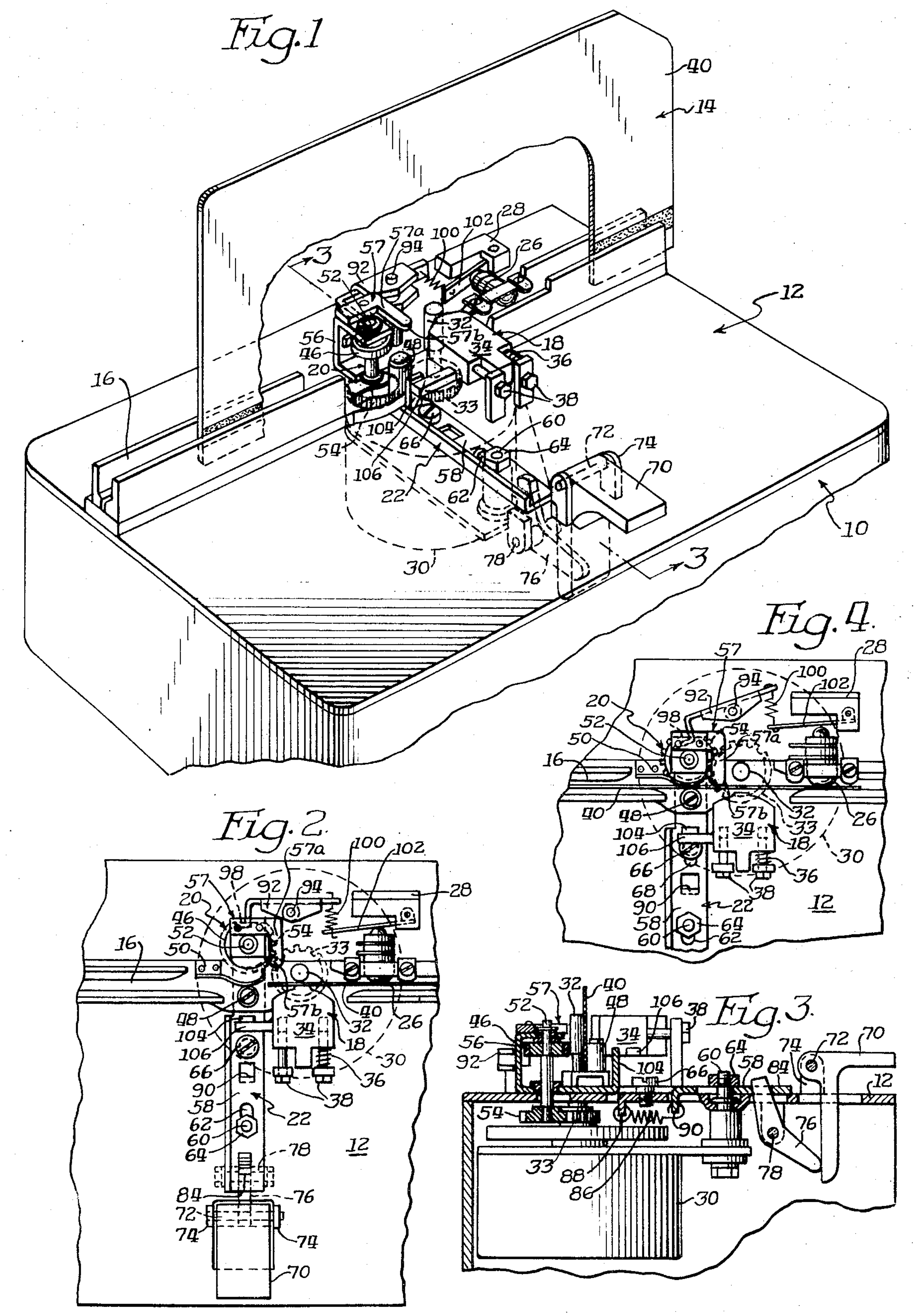
FIG. 1 is a left front perspective view showing the card handling mechanism feeding the information card in the forward direction with a portion of the card cut away to better show the mechanism.
FIG. 2 is a plan view showing the first drive means engaging the card for forward feed.
FIG. 3 is a partial left end elevational view of FIG. 2.
FIG. 4 is a plan view showing the second drive means engaging the card for returning the card toward the initial position.

Even though this card handling mechanism is herein disclosed with a teaching machine, the mechanism is understood to be adaptable to other machines such as punched card, strip film, and projector slide handling machines.

In operating the machine, the operator inserts an information card into proximity with a forward feed drive means. A switch is closed by the card to activate the forward feed drive means. The card is advanced past a transducer head for recording sound on or reproducing sound therefrom. The trailing end of the card advances beyond the forward feed drive means and stops in alignment with the return drive means. The card may be removed from the machine while in this position A control means is selectively operable to close the aforementioned switch and operable to engage the normally idle return drive means with the forward feed drive means for transmitting rotating movement to the return drive means for rotating the return drive means in a reverse direction relative to the forward feed drive means. The control means is also operable to condition the forward feed drive means to be ineffective relative to feeding the card and operable to engage the return drive means with the card. The control means is further operable to render the blocking means operable to prevent abutment or entanglement of the leading end of the card with the return drive means. The leading end of the card is returned beyond the return drive means and stops in alignment with the forward feed drive means. The card may be removed from the machine while in this position.

Releasing the control means deactivates the return drive means and permits the forward feed drive means to engage and feed the card in the forward direction.

Referring to FIG. 1, the teaching machine includes a housing 10 and a support member 12 with the card handling mechanism mounted thereon. An information card 14 is supported in a guide track 16. The card 14 is engaged by a first drive means, generally designated by the numeral 18, for feeding the card in a forward direction, toward the left in this drawing. The second drive means 20 is shown in an ineffective position. The selectively operable control means 22 is shown in a normal non-actuated position.

Referring now to FIGS. 1 and 2, when a card 14 is first inserted in the guide track 16, the forward end 24 is manually moved to drive a plunger 26 rearward which actuates a switch 28. The switch 28 energizes a motor 30. The motor 30 rotates a feed roller or a capstan 32, and a gear 33 clockwise about the axis of the capstan 32. When the control means 22 is in the normal non-actuated position, a detection means or transducer head 34 is biased against the capstan 32 by a spring 36. The transducer head 34 is slidably supported on a pair of posts 38 for movement toward and away from the capstan 32. The forward end 24 of the card 14 is further manually moved until the card 14 displaces the transducer head 34 away from the capstan 32 which engages the card 14 between the rotating capstan 32 and the transducer head 34. The card 14 may now be released by the operator and the rotating capstan 32 will feed the card 14 in the forward direction for reproducing sound from or recording sound on the card 14. The card 14 will be fed across the machine until the trailing end 40 is fed beyond the plunger 26 which releases the switch 28 and de-energizes the motor 30. The inertia in the rotating motor is sufficient to cause the capstan 32 to drive the trailing end 40 of the card 14 beyond the capstan 32 and the transducer head 34. The card 14 comes to rest with the trailing end 40 in alignment with the second drive means 20.

Referring to FIGS. 2 and 4, the second drive means 20 includes a power drive roller 46 and a backup roller 48. The backup roller 48 cooperates with a leaf spring 50 to hold the card 14 in the same upstanding orientation as in forward feed. The power driven roller 46 is rigidly mounted near the upper end of shaft 52 and a gear 54 is rigidly mounted near the lower end of the shaft 52. The shaft 52 is pivotably supported in a U-shaped end 56 integrally formed from a control lever 58. Secured to the top of U-shaped end 56 above power drive roller 46 is a blocking and guide member in the form of an L-shaped guiding plate, generally designated 57, having a leg 57*a* extending between the axes of roller 46 and capstan 32 and terminating in a rounded card engaging and camming end edge at 57*b*.

A control lever 58 is slidably mounted on the support member 12. A post 60 is rigidly mounted to the underside of the support member 12 and extends through an elongated aperture 62 in the control lever 58 to guide the sliding movement of the control lever 58. A nut 64 is threaded on the upper end of the post 60. A screw 66 extends through a second elongated aperture 68 in the control lever 58 and is threaded into the surface member 12. The screw 66 cooperates with the post 60 to guide longitudinal sliding movement of the control lever 58.

A control button 70 is pivotally supported on a shaft 72 which, in turn, is supported on a pair of tabs 74 extending upward from the support member 12. A lever 76 is pivotally supported on a shaft 78 which, in turn, is supported on a pair of tabs 80 extending downwardly from the support member 12. The lever 76 has one end abutting against a lower extending arm 82 of the control button 70 and has the other end extending through an aperture 84 in the control lever 58.

A spring 86, FIG. 3, has one end connected to an anchor 88 formed downward from the support member 12 and has the other end connected to an anchor 90 formed downward from the control lever 58. The spring 86, thus connected, biases the control lever 58 rearward to a limited position determined by the control lever 58 abutting against the post 60 as shown in FIG. 2. A switch actuator 92, FIGS. 2 and 4, is pivotably supported on shaft 94. One end of the actuator 92 has a formed finger 96 extending through an aperture 89 in the control lever 58. The opposite end of the actuator 92 has one end of a spring 100 connected thereto. The other end of the spring 100 is connected to a switch member 102.

The operation of the card handling mechanism to replay a word or a group of words will now be described. After the card 14 has been fed in the forward direction from the position shown in FIG. 2 to the position shown in FIG. 4, the information on the card 14 has been played or reproduced. Depressing the control button 70 pulls the control lever 58 toward the operator. The control lever 58 has an upstanding abutment 104 that engages an arm 106 extending from the transducer head 34 and moves the transducer head 34 away from the capstan 32, disengaging the first drive means 18. This movement also frees the card 14 so that information on the card cannot be sensed during card return. The forward movement of the control lever 58 also pivots switch actuator 92 counter-clockwise about the shaft 94 which causes the spring 102 to actuate the switch 28. The motor 30 is then energized which rotates the gear 33 in a clockwise direction.

Another function of the forward movement of the control lever 58 is to pull the shaft 52 forward to engage the gear 54 with the rotating gear 33 and to engage the power driven roller 46 with the card 14 to press the card 14 against the backup roller 48, as shown in FIG. 4. The guiding plate 57 moves forward with power driven roller 46. The gear 33 rotates the gear 54 counter-clockwise which, in turn, rotates the power driven roller 46 counter-clockwise. In this manner, depressing the control button 70 disengages the first drive means 18, engages the second drive means 20 which drives the card 14 in a return direction toward the right as viewed in FIGS. 1, 2 and 4, and positions the card guiding plate 57 to prevent the card from diverting toward the first drive means 18. Since the power driven roller 46 is larger in diameter relative to the capstan 32 and since the shaft 52 and the capstan 32 are rotated at substantially the same rate, the card 14 is driven in the return direction at a rate faster than the rate in the forward direction.

Should the card tend to move toward engagement with capstan 32 as it begins its return movement, the card edge engages the rounded edge 57*b* on the end of leg 57*a* of the guiding plate 57 and is redirected along its proper return path, i.e., the same general path as for forward movement. The return movment of the card 14 again drives the plunger 26 rearward to hold the switch 28 in an actuated condition to keep the motor 30 energized.

To return the card 14 to an inital position as shown in FIG. 2, the operator merely holds the control button 70 depressed until the forward end 24 of the card 14 is driven from between the roller 46 and the backup roller 48. The forward end 24 of the card 14 will come to rest in alignment with the first drive means 18.

Replaying the information on the card 14 is now accomplished by releasing the control button 70. When the control button is released, the spring 86 urges the control lever 58 from the position shown in FIG. 4 to the position shown in FIG. 2, the second drive means 20 is disengaged and the abutment 104 releases the transducer head 34 allowing the spring 36 to urge the transducer head into engagement with capstan 32. The re-engagement of the first drive means 18 again feeds the card 14 in the forward direction thereby replaying the entire card 14.

To replay a word or a group of words, as compared to the entire card 14, the operator would know approximately where along the length of the card 14 the word or group of words is recorded. The control button 70 may be depressed at any time during the forward feed of the card 14 after the words have been played. When depressed, the first drive means 18 is disengaged, which stops the forward feeding, and the second drive means 20 is engaged, which starts the return movement of the card 14. By watching the card 14 return, the operator can release control button 70 at the time he believes the card 14 has returned far enough to position the words ahead of the first drive means 18. At this time, the operator releases the control button 70. The second drive means 20 becomes disengaged and the first drive means becomes engaged thereby feeding the card 14 in the forward direction which will replay the word or group of words selected. By repeatedly depressing and releasing the control button 70, the replaying of a word, group of words or the entire card may be repeated as long as may be desired.

If no repetition is desired, insertion of the card 14 to the position shown in FIG. 2 will cause the mechanism to feed the card 14 past the transducer head 34 and stop in the position with the trailing end 40 in alignment with the second drive means 20. The internal tension or switch 28 will open the switch 28 which deenergizes the motor 30. The card 14 may now be removed from the machine.

The present card handling mechanism is further operable to disengage the first drive means 18 and the second drive means 20 simultaneously. With this feature, the operator may stop the card during movement in either direction and may then choose which direction to move the card. This is accomplished by depressing the control button 70 only a portion of its normally operating stroke. Partially depressing the control button 70 moves the transducer head 34 away from the capstan 32 and out of contact with the card 14, moves the power driven roller 46 and guiding plate 57 towards the backup roller 48, but not far enough to engage the card 14 with the backup roller 48. Once in the partially depressed condition, the control button may then be depressed completely to engage the second drive means 20 to drive the card 14 in the return direction or may be released to engage the first drive means 18 to drive the card 14 in the forward direction. An operator may readily acquire a skill to efficiently disengage both drive means and thereafter move the card 14 in either direction.

It can be seen that the present card handling machine is selectively operable to drive a magnetically striped information card in a return direction by depressing a control button while eliminating chance engagement of the card edge with the forward drive means.

What I claim is:

1. An information card handling mechanism which has detection means for utilizing information on the card, first drive means operable for feeding the card from an initial position in a forward direction past the detection means, second drive means operable for returning the card in the reverse direction including a backup roller and a power driven roller mounted for movement toward said backup roller in actuated position to press the card therebetween guide means operable for diverting the card from said first drive means, and common control means for actuating said second drive means and also actuating the guide means upon operation of the second drive means returning the card in reverse direction, said guide means comprising a plate mounted for movement with said power driven roller responsive to actuation of the common control means, the plate having a rounded camming edge for camming the card away from engagement with said first drive means.

2. The mechanism as defined in claim 1 wherein said plate is L-shaped and the rounded edge is at a leg end.

3. In an information card handling mechanism which has detection means for utilizing information on the card, first drive means operable for feeding the card from an initial position in forward direction past the detection means and second drive means operable for returning the card in the reverse direction, the improvement comprising guide means operable for diverting the card from said first drive means and common control means for actuating the second drive means and also actuating the guide means upon operation of said second drive means returning the card in reverse direction, said control means including manually operable selection means for causing the second drive means and guide means to engage the information card for movement in return direction along its proper path.

4. An information card handling mechanism comprising:

a transducing means for recording information on the card and producing information from the card;

first drive means selectively operable for operatively engaging the card with the plane of the card in a generally vertical orientation and feeding the card from an initial position in a forward direction in a path of travel past the transducing means;

a second, idler drive means spaced from said first drive means in said forward direction and selectively operable for returning the card in the reverse direction to any desired position, said idler drive means being selectively movable bodily from a first position out of engagement with a card in a direction generally transverse said path of travel to a second position in operative engagemeent with the card;

generally rigid guide means disposed adjacent said path of travel and between said first and second drive means and movable generally transverse to said path of travel for camming a card away from engagement with said first drive means; and control means for actuating said guide means upon operation of said second drive means returning the card in reverse direction.

5. The mechanism as defined in claim 4 wherein said guide means comprises a plate having a rounded camming edge for camming a card away from engagement with said first drive means.

6. The mechanism as defined in claim 4 wherein said control means is a common control for also actuating the second drive means.

7. The mechanism as defined in claim 6 wherein said guide means and second drive means are actuated simultaneously by said control means.

8. The mechanism as defined in claim 6 wherein said common control also disengages said first drive means while actuating the second drive means and guide means.

* * * * *